United States Patent [19]
Deb et al.

[11] 4,120,568
[45] Oct. 17, 1978

[54] ELECTROCHROMIC CELL WITH PROTECTIVE OVERCOAT LAYER

[75] Inventors: Satyendra Kumar Deb, East Brunswick; Horst Witzke, Princeton, both of N.J.

[73] Assignee: Optel Corporation, Princeton, N.J.

[21] Appl. No.: 758,734

[22] Filed: Jan. 12, 1977

[51] Int. Cl.² .............................. G02F 1/00
[52] U.S. Cl. ............................. 350/357
[58] Field of Search ............... 350/160 R, 357

[56] References Cited
U.S. PATENT DOCUMENTS

| | | | |
|---|---|---|---|
| 3,981,560 | 9/1976 | Heyman | 350/160 R |
| 4,033,673 | 7/1977 | Seki | 350/160 R |
| 4,037,928 | 7/1977 | Champ et al. | 350/160 R |

Primary Examiner—Stanley D. Miller, Jr.
Assistant Examiner—James W. Davie
Attorney, Agent, or Firm—Morris Liss; Israel Gopstein

[57] ABSTRACT

An electrochromic device having an electrochromic layer and an electrolyte sandwiched between electrodes. A charge compensator ion permeable layer is interposed between the electrochromic layer and the electrolyte. The latter-mentioned interposing layer serves as a protective overcoat for the electrochromic layer and minimizes the structural decay of the cell which might otherwise occur.

18 Claims, 2 Drawing Figures

ELECTROCHROMIC CELL WITH PROTECTIVE OVERCOAT LAYER

FIELD OF THE INVENTION

The present invention relates to electrochromic devices and, more particularly, to such a device having a protective overcoat layer interposed between an electrochromic layer and an electrolyte.

BRIEF DESCRIPTION OF THE PRIOR ART

The prior art has recognized the usefulness of electrochromic devices wherein the electromagnetic absorption characteristics may be reversibly altered by a controlled electric field. The device is particularly useful as a display device or in light valve-type applications.

U.S. Pat. No. 3,708,220 issued to Meyers describes a device which consists of an electrochromic material in contact with a semisolid electrolyte gel sandwiched between a pair of electrodes. U.S. Pat. No. 28,188, issued to Deb et al, discloses a completely solid state electrochromic device which utilizes a current carrier permeable layer positioned between an electrochromic layer and a conductive layer. The reissue patent states that the structure set forth therein is an improvement over basic electrochromic cells that had previously included only an electrochromic layer sandwiched between two conductive layers. In U.S. Pat. No. 3,840,287, issued to Witzke et al, there is an electrochromic device which is described as including two electrochromic layers in different states and an electrolyte layer which is not limited to semisolid gels. In the Meyers and Witzke patents, the structure included an electrolyte or color assisting agent, respectively, which is described as being in direct contact with an electrochromic layer. This contact was thought necessary to insure ionic charge transport from the electrolyte to the electrochromic layer. However, these prior art structures have been found to lack a certain desirable cycling capability of lifetime due to an observable decay in the cell due to a deterioration of the electrochromic layer — electrolyte interface, which is due to the contact therebetween.

BRIEF DESCRIPTION OF THE PRESENT INVENTION

The present invention relates to a novel structure for extending the life of an electrochromic device, having an electrolyte or color assisting agent, by interposing a protective overcoat layer between the electrolyte or color assisting agent and the electrochromic layer. More particularly, the electrochromic device comprises a pair of electrodes, there being between the electrodes at least one layer of electrochromic material, an electrolyte layer, and a protective overcoat layer between the electrochromic layer and the electrolyte layer. The protective overcoat layer is a substantially insulating dielectric layer. Normally, one would expect that the placement of a substantially insulating dielectric layer separating the electrochromic layer and the electrolyte would inhibit the necessary current flow of the device and be detrimental to the normal operation of the device. Contrary to this, an unexpected synergistic result is obtained. It has been discovered that the insertion of certain substantially insulating materials in the form of thin films not only does not adversely affect the operation of the device, but rather substantially increases the life of the device by inhibiting attack and degradation of the electrochromic layer.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Figure 1:
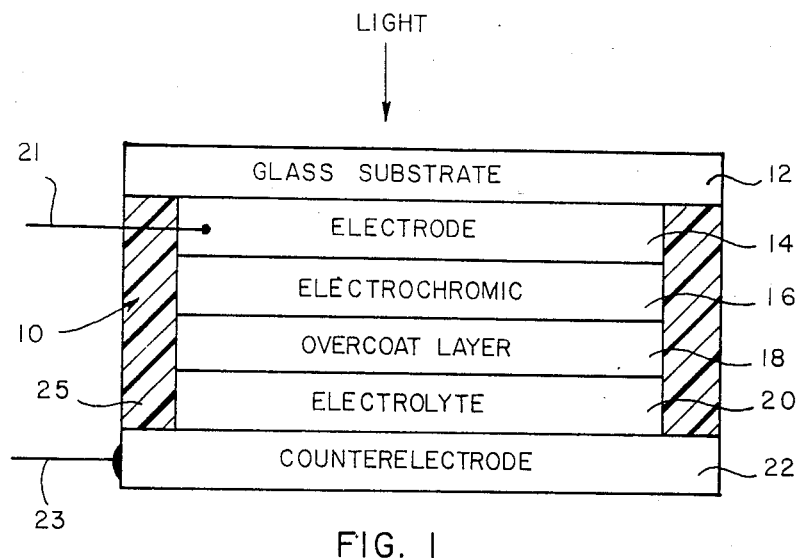
FIG. 1 is a schematic cross-sectional view of a first embodiment of the invention wherein a single electrochromic layer is included.

Referring to the figures, and more particularly FIG. 1 thereof, a transparent substrate 12 fabricated from materials such as glass, forms the supporting layer for the device. The transparent electrode 14 is deposited on the substrate 12. The transparent electrode may be selected from any one of well-known transparent conductive electrodes. Examples of suitable electrodes are tin oxide and indium oxide. The combination of the glass substrate 12 and a tin oxide electrode is commercially available and known as Nesa glass. When the device 10 is to be used in a light transmitting display of light valve, the electrode 14 and the counterelectrode 22 must both be transparent. However, when the device operates in a light reflective mode, the counterelectrode 22 may either be transparent, opaque or reflective and may be selected from any conductive material which is non-reactive with the layer in contact with it. Typical counterelectrode materials include noble metals, acid resistant metals, carbon, and even electrochromic materials as recognized by the prior art.

An electrochromic layer 16 is deposited on the electrode 14 by conventional methods such as vacuum evaporation of tungsten oxide. Other suitable materials can be found with reference to the mentioned prior art. For example, the aforementioned Meyers patent and the patent to Deb discuss appropriate electrochromic materials. By way of example, the thickness of the electrochromic layer may typically be 5,000 Angstroms although this is not a limitation.

An overcoat layer 18 is deposited on the electrochromic layer 16 by using conventional techniques such as sputtering. Theoretically, it is hypothesized that the overcoat layer 18 is a charge compensator ion permeable layer for the device, and it is believed that this layer must be permeable to the electrolyte cation, which in the preferred device is hydrogen. However, regardless of the veracity of this theory, the disclosed structure is operative. The layer must also be more resistant to attack from the electrolyte layer 20 than the electrochromic layer 16. It has been discovered that the preferred overcoat layer 18 may be included so that it does not give rise to substantial increases in the voltage necessary to operate the device. In order to obtain this objective, a layer 18 of tin oxide is included. A typical, but not restrictive thickness range of this layer is given as 100 to 1,000 Angstroms. The tin oxide may also be doped with antimony, for example. Other suitable materials for layer 18 may be silicon oxide, silicon oxide doped with gold, titanium oxide and chromium nitride, as well as mixtures of the above.

An electrolyte layer 20 is placed in contact with the overcoat layer 18, as shown in FIG. 1. The electrolyte layer, which is hypothesized to function as a source of charge compensating ions during the electrochromic coloring process, is typically an acidic media in the form of a liquid or a gel. Suitable electrolytes can be found with reference to the Meyers patent. A preferred electrolyte not recognized in the prior art is a phosphoric acid solution wherein the phosphoric acid may be mixed with materials such as water, glycerine, polyvinyl alcohol, or combinations thereof, so as to obtain the desired consistency and conductivity. In addition, if a device is to operate in a reflective mode, the electrolyte layer may also contain an opacifier or pigment such as titanium dioxide.

A final layer for the embodiment as shown in FIG. 1 is a counterelectrode 22. Typical materials for such a counterelectrode have been previously mentioned in connection with the description of the electrode 14.

Leads 21 and 23 are respectively connected to the electrode 14 and counterelectrode 22, while an encapsulating insulative wall 25 encloses the various layers of the device. The wall 25 may be of any suitable inert material such as epoxy.

In operation of the device, the absorption characteristics for impinging light may be varied by imposing a voltage across the leads 21 and 23. The device may be either used in a light transmitting display or light valve mode, as well as a light reflective mode. The mode is determined by either making the counterelectrode transparent, reflective or opaque, as previously discussed. Also, if the device is to operate in a reflective mode, the electrolyte layer 20 may also contain an opacifier or pigment such as titanium dioxide.

Figure 2:
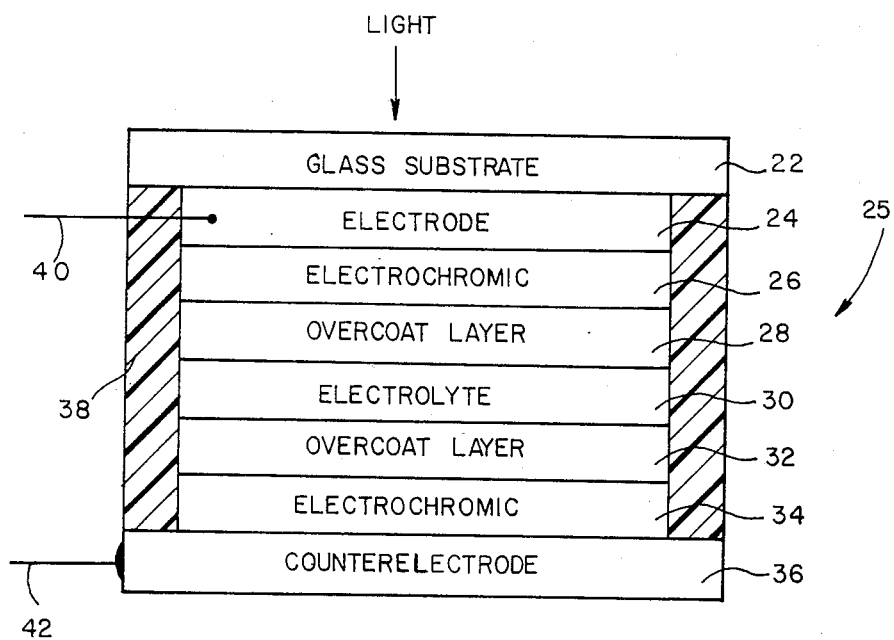
FIG. 2 is a schematic cross-sectional view of a second embodiment of the present invention wherein two electrochromic layers are included in a symmetrical configuration.

FIG. 2 discloses an alternate embodiment of the present invention. As will be appreciated by studying FIG. 2, this second embodiment is a symmetrical version of the embodiment of FIG. 1, utilizing two electrochromic and electrolyte layers. The purpose of the embodiment shown in FIG. 2 is to incorporate a protective overcoat layer in a symmetrical device, which as a basic unit, without a protective overcoat layer is disclosed in U.S. Pat. No. 3,840,288.

The substrate 22, electrode 24, electrochromic layer 26, overcoat layer 28, electrolyte layer 30 and counter-electrode 36 correspond with similar illustrated parts explained in connection with FIG. 1. However, an additional overcoat layer 32 and electrochromic layer 34 are included and positioned in symmetrical relationship with respect to the electrolyte layer 30. An insulating wall 38 corresponds with the similar component 25, of FIG. 1. Likewise, leads 40 and 42 control the light varying capability on the indicated impinging light.

Normally, one would expect that the placement of a substantially insulating dielectric layer, such as the overcoat layers 18, 28, 32, separating the electrochromic layers shown in FIGS. 1 and 2, and the respective electrolyte layers would inhibit the necessary current flow of the device and be detrimental to the normal operation of the device. Contrary to this, it has been discovered that the insertion of certain substantially insulating materials in the form of thin films, not only does not adversely affect the operation of the device, but rather performs the synergistic effect of substantially increasing the life of the device by inhibiting attack of the electrochromic layer or layers.

It should be understood that the invention is not limited to the exact details of construction shown and described herein for obvious modifications will occur to persons skilled in the art.

What we claim is:

1. An electrochromic device comprising:
   a transparent substrate for admitting impinging light into the device;
   an electrode deposited, along a first surface thereof, on the substrate;
   an electrochromic layer deposited on an opposite surface of the electrode;
   an electrolyte layer positioned in spaced relationship to the electrochromic layer;
   overcoat means positioned in contacting interposing relation to the electrochromic and electrolyte layers for protecting the electrochromic layer from degradation by the electrolyte layer;
   a counterelectrode contacting the electrolyte layer; and
   electrical leads connected to the electrode and counterelectrode for imposing a voltage across the device and controlling the transmission characteristics of the device to impinging light.

2. Subject matter set forth in claim 1 wherein the electrochromic layer is tungsten oxide.

3. Subject matter set forth in claim 1 wherein the overcoat means is comprised of a substantially insulating dielectric layer of preselected material.

4. Subject matter set forth in claim 1 together with means circumferentially bounding the device for insulatively encapsulating the device.

5. The subject matter set forth in claim 1 wherein the electrolyte layer is comprised of phosphoric acid.

6. The subject matter set forth in claim 2 wherein the overcoat means is comprised of a substantially insulating dielectric layer of preselected material and further together with means circumferentially bounding the device for insulatively encapsulating the device.

7. The subject matter of claim 3 wherein the overcoat means is tin oxide.

8. The subject matter of claim 5 wherein the overcoat means is tin oxide.

9. An electrochromic device comprising:
   an intermediately positioned electrolyte layer;
   separate overcoat layers positioned in symmetrical contact with opposite surfaces of the electrolyte layer;
   separate electrochromic layers symmetrically contacting outward surfaces of the overcoat layers;
   electrode layers symmetrically contacting outward surfaces of the electrochromic layers for carrying a voltage across the device and thereby controlling the transmission characteristics of the device to impinging light;
   wherein the overcoat layers protect the electrochromic layers from degradation by the electrolyte layer, thereby extending the useful life of the device.

10. The subject matter set forth in claim 9 wherein the electrolyte layer comprises phosphoric acid.

11. The subject matter set forth in claim 9 together with a substrate upon which the other device layers are deposited, the substrate being transparent to impinging light.

12. The subject matter set forth in claim 9 together with electrical leads connected to the electrode layers for carrying a voltage across the electrode layers.

13. The subject matter set forth in claim 11 together with electrical leads connected to the electrode layers for carrying a voltage across the electrode layers.

14. The subject matter set forth in claim 13 wherein the electrochromic layers are tungsten oxide.

15. The subject matter set forth in claim 14 wherein the overcoat layers are comprised of substantially insulating dielectric layers of preselected material.

16. The subject matter of claim 10 wherein the overcoat means is tin oxide.

17. The subject matter of claim 15 wherein the overcoat means is tin oxide.

18. An electrochromic device comprising:
  a transparent substrate for admitting impinging light into the device;
  an electrode deposited, along a first surface thereof, on the substrate;
  an electrochromic layer deposited on an opposite surface of the electrode;
  an electrolyte layer comprising phosphoric acid positioned in spaced relation to the electrochromic layer;
  means spacing said electrolyte layer from said electrochromic layer;
  a counterelectrode contacting the electrolyte layer; and
  electrical leads connected to the electrode and counterelectrode for imposing a voltage across the device and controlling the transmission characteristics of the device to impinging light.

* * * * *